Oct. 29, 1935.　　　　　C. A. NICKLE　　　2,019,355
HUMIDITY RESPONSIVE DEVICE
Filed Jan. 15, 1932
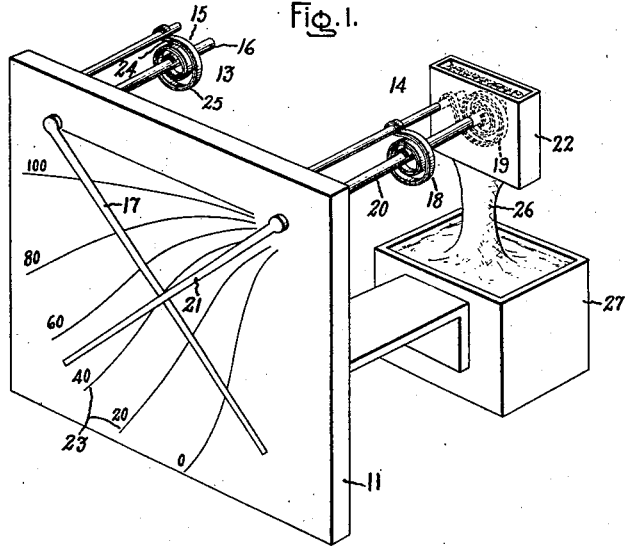
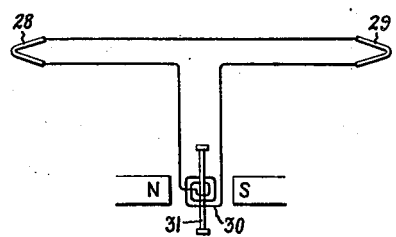
Inventor:
Clifford A. Nickle,
by Charles  
　　　　　His Attorney.

Patented Oct. 29, 1935

2,019,355

UNITED STATES PATENT OFFICE 2,019,355

HUMIDITY RESPONSIVE DEVICE

Clifford A. Nickle, Schenectady, N. Y., assignor to General Electric Company, a corporation of New York Application January 15, 1932, Serial No. 586,932

6 Claims. (Cl. 73—24)

My invention relates to humidity responsive devices and has for its principal object the provision of a direct indicating hygrometer which maintains its calibration with a relatively high degree of accuracy.

In accordance with my invention I provide a pair of indicating elements cooperating with a series of scales or with a two-dimensional scale. One of the indicating elements is responsive to the difference between the temperatures that would be measured by dry bulb and wet bulb thermometers, and the other is responsive to the ambient temperature. The two elements acting together determine a point on the scale to give a reading in terms of relative humidity or other suitable units.

The features of my invention which I believe to be novel and patentable will be pointed out in the claims appended hereto. My invention itself, however, will be best understood by referring to the following specification taken in connection with the accompanying drawing in which Fig. 1 represents an embodiment of my invention employing bimetallic thermostatic strips, and Fig. 2 represents a portion of the apparatus modified to utilize thermocouples.

Referring more in detail to the drawing, a scale board 11 is represented carrying the indicating units 13 and 14. The unit 13 comprises a coiled thermostatic bimetallic strip 15, which twists a shaft 16 carrying a pointer 17 in response to changes in the ambient temperature or the temperature of the atmosphere surrounding the instrument.

The unit 14 comprises a pair of coiled bimetallic strips 18 and 19 tending to twist a shaft 20 carrying a pointer 21 in opposite directions in accordance with variations in temperature. The bimetallic strip 18 is subjected to the ambient temperature of the surrounding air but strip 19 is cooled below the ambient temperature by the evaporation of moisture from its surface or from a porous enclosing member 22. The deflection of pointer 21 therefore represents the difference between wet bulb and dry bulb temperatures or the depression in temperature caused by evaporation, and the amplitude of the deflection depends upon the rate of evaporation. The rate at which moisture can evaporate from member 22 depends, in turn, upon the relative humidity of the surrounding air, so that the deflection of pointer 21 is dependent upon the relative humidity.

With variations in the ambient temperature, however, the relationship between relative humidity and the depression in temperature caused by evaporation varies somewhat. In order to obviate the necessity for correcting the readings of my instrument for ambient temperature, the pointer 21 is read with a scale, the values of the graduations of which vary with ambient temperature. The scale board 11 has drawn upon its surface a plurality of curves 23, to provide a set of scales shown graduated in percentages of humidity. Each of the curves 23 intersects the pointer to form a slightly different scale of relative humidities for each position of the pointer 17, which deflects in accordance with ambient temperature. The point of intersection of pointers 21 and 17 accordingly gives a reading of relative humidity directly at any ambient temperature within the range of the instrument.

Although I have shown a pair of crossed movable pointers cooperating with a stationary set of curves forming a superficial or two-dimensional scale, or a set of scales it will be understood that my invention is not limited to this exact arrangement but obviously includes arrangements having movable scales or rows of numerals instead of curves.

Each of the thermometric strips 15, 18, and 19 comprises a pair of ribbons composed of metals having different temperature coefficients of expansion, such as iron and copper, fastened together in any suitable manner as by riveting and coiled with the metal of the greater coefficient of expansion on the inside. As the temperature rises the copper ribbon 24 of element 15 expands more than the iron ribbon 25 so that the shaft 16 and pointer 17 are rotated in a counterclockwise direction. In like manner the thermostatic strip 18 tends to twist the shaft 20 in a counter clockwise direction, whereas the strip 19 being coiled in the opposite direction tends to twist the shaft 20 in a clockwise direction as the temperature rises. However, whenever the humidity is less than 100% there will be some evaporation from and cooling effect on strip 19 so that the strip 18 will overcome strip 19 to an extent dependent upon the difference in temperatures of strips 18 and 19. Although I have described thermometric units with the parts arranged in a particular manner it will be understood that I am not limited to this exact arrangement.

Any suitable means may be employed to cause the strip 19 to be directly or indirectly cooled by evaporation, but I prefer to provide a wick 26 dipping into a reservoir of water 27 and surrounding the strip 19 at its upper end. To prevent the wick 26 from being wound up as the strip 19 and shaft 20 twist, the wick is preferably fastened to a wire mesh screen 22, which is arranged in such a manner that free evaporation is permitted and the space enclosing strip 19 is cooled thereby.

Although I have shown an apparatus employing thermometric elements of the bimetallic strip type it will be understood that my invention is not limited thereto but obviously includes any suitable type of temperature responsive elements, such as thermocouples, gas or liquid pressure or expansion devices, instruments containing temperature sensitive magnetic material or electrical resistance material, and the like. For example, I may substitute a pair of thermocouples 28 and 29 for the bimetallic thermostatic strips 18 and 19. One of the thermocouples is subjected to cooling by evaporation of moisture from a wick or other suitable means for conducting moisture to the thermocouple. The current flowing in coil 30 of a millivoltmeter connected in circuit with thermojunctions 28 and 29, depends on difference in temperature between the two junctions, and rotates a shaft 31 which may be substituted for the shaft 20 of the apparatus shown in Fig. 1.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. In a hygrometer, the combination of a two-dimensional scale, a pair of pointers cooperating therewith and with each other, means for causing one of said pointers to deflect over said scale in accordance with variations in ambient temperature, and means for causing the other of said pointers to deflect over said scale transversely to said first mentioned pointer in accordance with differences between wet bulb and dry bulb temperatures, the point of intersection of said pointers serving to determine the scale reading.

2. In a hygrometer, the combination of a set of scales, a pointer responsive to the difference between wet bulb and dry bulb temperatures and cooperating with said scales, a second pointer responsive to ambient temperature and deflecting over said scales and transversely to said first pointer to determine which of said scales is to be read with said first pointer.

3. A hygrometer comprising in combination, a two-dimensional scale, a pair of crossed pointers cooperating therewith, a bimetallic thermostatic strip controlling the position of one of said pointers in response to ambient temperature, a pair of bimetallic thermostatic strips acting in opposition to control the position of the other of said pointers in response to the difference between ambient temperature and wet bulb temperature, and means for cooling one of said opposing thermostatic strips by evaporation, said scale being so arranged that the point of intersection of said pointers indicates relative humidity.

4. In combination, means responsive to ambient temperature, means responsive to the difference between dry bulb temperature and wet bulb temperature comprising a pair of opposing bimetallic thermostatic strips and means for cooling one of them by evaporation, means jointly actuated by said ambient temperature responsive means, and said differential temperature responsive means to provide an indication of relative humidity.

5. A device responsive to relative humidity comprising a thermostatic bimetallic strip, means for cooling said strip by evaporation, and a second thermostatic bimetallic strip acting in opposition to the first mentioned strip, said bimetallic strips being connected at both ends.

6. A hygrometer comprising, in combination a two-dimensional scale, a pair of crossed pointers cooperating therewith, temperature responsive means controlling the position of one of said pointers in response to ambient temperature, means for controlling the position of the other of said pointers in response to the difference between ambient temperature and wet bulb temperature, said differential means comprising a deflecting electrical instrument, a pair of thermocouples connected thereto, and means for cooling one of said thermocouples by evaporation, said scale being so arranged that the point of intersection of said pointers indicates relative humidity.

CLIFFORD A. NICKLE.